United States Patent
He et al.

(10) Patent No.: US 10,000,297 B2
(45) Date of Patent: Jun. 19, 2018

(54) AIRCRAFT DISPLAY SYSTEMS AND METHODS FOR GENERATING HORIZONTAL SITUATION INDICATOR GRAPHICS WITH ENHANCED SYMBOLOGY

(71) Applicant: HONEYWELL INTERNATIONAL INC., Morris Plains, NJ (US)

(72) Inventors: Gang He, Morristown, NJ (US); Jason F. Harvey, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 25 days.

(21) Appl. No.: 15/280,652

(22) Filed: Sep. 29, 2016

(65) Prior Publication Data
US 2018/0086477 A1    Mar. 29, 2018

(51) Int. Cl.
*G09G 5/30* (2006.01)
*B64D 43/00* (2006.01)
(Continued)

(52) U.S. Cl.
CPC ............ *B64D 43/00* (2013.01); *G06T 3/60* (2013.01); *G09G 5/363* (2013.01); *G09G 2360/06* (2013.01); *G09G 2380/12* (2013.01)

(58) Field of Classification Search
CPC .......... G01C 21/00; G01C 23/00; G06T 11/00
See application file for complete search history.

(56) References Cited

U.S. PATENT DOCUMENTS 8,392,039 B2    3/2013    He et al.
9,297,668 B2    3/2016    He
(Continued)

FOREIGN PATENT DOCUMENTS

EP    2128732 A1    2/2009
EP    1816439 B1    9/2011
(Continued)

OTHER PUBLICATIONS

"Flight Logic EFIS Synthetic Vision Flight Display," Chelton Flight Systems Inc., Feb. 9, 2003.
(Continued)

*Primary Examiner* — Phi Hoang
(74) *Attorney, Agent, or Firm* — Lorenz & Kopf, LLP (57) ABSTRACT

Aircraft display systems for deployment onboard rotorcraft or other aircraft are provided, as are methods carried-out by an aircraft display system. In an embodiment, the aircraft display system includes a controller operably coupled to at least one cockpit display device. The controller is configured to generate a Primary Flight Display (PFD) and Horizontal Situation Indicator (HSI) graphics on the cockpit display device. The controller selectively switches PFD operation between a heading-centered display mode and at least a first non-heading-centered display mode. The HSI graphics are produced to include one or more movable HSI symbols identifying a current aircraft heading when the PFD operates in the first non-heading-centered display mode. In certain embodiments, the controller may also selectively generate visual alerts on the PFD by altering the appearance of the HSI graphics when an angle between the current track and the current heading of the aircraft exceeds an angular threshold.

20 Claims, 4 Drawing Sheets

(51) Int. Cl.
*G06T 3/60* (2006.01)
*G09G 5/36* (2006.01)

(56) References Cited

U.S. PATENT DOCUMENTS

| | | | | |
|---|---|---|---|---|
| 2003/0222887 | A1* | 12/2003 | Wilkins, Jr. | G01C 23/005 345/618 |
| 2007/0085707 | A1* | 4/2007 | Wyatt | G01C 23/005 340/979 |
| 2007/0126602 | A1* | 6/2007 | Bateman | B64D 45/0005 340/959 |
| 2007/0179684 | A1* | 8/2007 | He | G01C 23/00 701/3 |
| 2010/0131126 | A1* | 5/2010 | He | G01C 21/00 701/14 |
| 2010/0156674 | A1* | 6/2010 | Dwyer | G01C 23/00 340/975 |
| 2011/0130897 | A1* | 6/2011 | Gladysz, Jr. | B64D 43/00 701/15 |
| 2014/0074325 | A1* | 3/2014 | Nikolic | G01C 23/005 701/14 |

FOREIGN PATENT DOCUMENTS

| | | |
|---|---|---|
| EP | 2523175 B1 | 7/2014 |
| EP | 2899509 A1 | 7/2015 |
| WO | 2010014804 A2 | 2/2010 |

OTHER PUBLICATIONS

Greenspun, Philip, "Cirrus SR20" Flying, Feb. 2015.
iNavigator Version 3.3.3.
He, Gang, et al., "Flight Test of a Hybrid-Centered Integrated 3D Perspective-View Primary Flight Display," Proceedings of SPIE 6226, Enhanced and Synthetic Vision 2006, 62260K, May 20, 2006.
"EFI-890H Advanced Flight Display Tailored to the Tactical Missions of Helicopter Operators," Universal Avionics Systems Corporation, 890H-01/16.
Extended EP Search Report for Application No. 17191996.2 dated Feb. 19, 2018.

* cited by examiner

AIRCRAFT DISPLAY SYSTEMS AND METHODS FOR GENERATING HORIZONTAL SITUATION INDICATOR GRAPHICS WITH ENHANCED SYMBOLOGY

TECHNICAL FIELD

The following disclosure relates generally to avionic display systems and, more particularly, to systems and methods for generating horizontal situation indicator graphics including enhanced symbology useful in piloting rotary wing aircraft and other aircraft.

BACKGROUND

In the context of avionic display systems, a Primary Flight Displays (PFD) is typically reserved for the presentation of vital flight information, such as pertinent flight parameters. When generated as a Synthetic Vision PFD or "SV-PFD," the PFD may include rendered terrain and other features simulating a glass cockpit view; that is, a view from the aircraft cockpit under ideal visibility conditions. Traditionally, a PFD is centered with respect to either aircraft heading or aircraft track. This is appropriate in the context of fixed wing aircraft as disparities between aircraft heading (the direction in which the aircraft is facing) and aircraft track (the direction in which the aircraft is traveling) are typically limited. However, in the context of rotary wing aircraft or "rotorcraft," it is not uncommon for relatively large disparities or "crab angles" to develop between rotorcraft heading and track. For at least this reason, certain rotorcraft display systems also enable operation of the PFD in a hybrid-centered or split-centered display mode in which the PFD is centered with respect to an intermediary reference point between rotorcraft heading and track. During operation, the rotorcraft display system may actively or automatically switch between PFD centering modes as a function of the disparity between rotorcraft heading and track, the location of nearby obstacles, current air speed, current ground speed, Altitude above Ground Level (AGL), and other such factors.

Switching a PFD between centering modes in the above-described manner can enhance the situational awareness of a pilot by allowing the selection of different centering modes appropriate for varying flight scenarios. However, as a consequence of such PFD mode switching, the particular centering mode in which the PFD is operating at a given juncture in time may not be readily apparent to a pilot when briefly glancing at a PFD. Furthermore, there may exist a relatively pronounced disparity between the Field of View (FOV) of the PFD and the forward-looking, real world view from the rotorcraft cockpit when the PFD operates in a non-heading-centered display mode, such as a track-centered display mode or a hybrid-centered display mode. This disparity may create temporary uncertainty in the mind of a pilot as to the precise relationship between the current heading and track of the rotorcraft. Such pilot uncertainty may be exacerbated when the PFD is generated to include Attitude Director Indicator (ADI) graphics, while Horizontal Situation Indicator (HSI) graphics are generated on or alongside the PFD. In such instances, a mismatch or inconsistency can develop between the orientation of certain symbology included in the ADI graphics (e.g., an ADI heading marker) relative to other symbology contained in the HSI graphics (e.g., the HSI heading marker, the orientation of which is typically fixed) when the PFD operates in a non-heading-centered display mode.

It is thus desirable to provide aircraft display systems and methods for generating enhanced symbology aiding in rapid pilot comprehension of the relationship between aircraft heading and aircraft track across multiple different PFD-centering modes. It would further be desirable if such enhanced symbology could be integrated into the HSI graphics generated on a display device located in the cockpit of a rotorcraft or other aircraft. Other desirable features and characteristics of the present invention will become apparent from the subsequent Detailed Description and the appended Claims, taken in conjunction with the accompanying Drawings and the foregoing Background.

BRIEF SUMMARY

Embodiments of an aircraft display system are provided, which is particularly well-suited for deployment onboard a rotary wing aircraft or "rotorcraft," but can generally be deployed onboard any aircraft including at least one cockpit display device on which a graphical display is generated. In one embodiment, the aircraft display system includes a controller operably coupled to at least one cockpit display device. The controller is configured to: (i) generate a Primary Flight Display (PFD) and Horizontal Situation Indicator (HSI) graphics on the at least one cockpit display device; (ii) selectively switch operation of the PFD between a heading-centered display mode and at least a first non-heading-centered display mode; and (iii) produce the HSI graphics to include a compass graphic and at least one movable HSI symbol, which is positioned proximate or adjacent the compass graphic. The movable HSI symbol visually identifies a current heading of the aircraft relative to the compass graphic when the PFD operates in the first non-heading-centered display mode. The movable HSI symbol or symbols can be, for example, a rotatable HSI aircraft icon and/or an HSI heading marker. In certain embodiments, the controller may also selectively generate visual alerts on the PFD by altering the appearance of the HSI graphics when an angle between the current track and the current heading of the aircraft exceeds an angular threshold. In other embodiments, the controller may further generate the HSI graphics to include a PFD centering marker, which moves with respect to the compass graphic to identify an intermediary point on which PFD is centered when operating in a split-centered display mode.

In another embodiment, the aircraft display system again includes a controller operably coupled to at least one cockpit display device. The controller is configured to generate a PFD and HSI graphics on the cockpit display device or devices. The HSI graphics are generated to include an HSI track marker and an HSI heading marker, which identify a current track and a current heading of the aircraft, respectively. When an angle between the current track and the current heading of the aircraft exceeds a threshold value, the controller further generates a visual alert on the PFD by altering the appearance of at least one graphic or symbol included HSI graphics in a predetermined manner. For example, the controller can vary the appearance of the HSI aircraft icon and/or the HSI heading marker when the angle between the current track and the current heading of the aircraft exceeds the angular threshold. In certain embodiments, the controller is further configured to produce the HSI graphics to include a compass graphic and a PFD centering marker, which moves with respect to the compass graphic to indicate the intermediary point on which PFD is centered when operating in a split-centered display mode. In other embodiments, the controller may be configured to produce the HSI graphics to include a movable HSI heading marker, which moves in conjunction with and may have an appearance similar to an Attitude Director Indicator (ADI) heading marker. In still further embodiments, the controller is configured to generate the HSI to include an aircraft icon, which is visually rotated to point towards the current heading of the aircraft when the PFD operates in the non-heading-centered display mode.

Embodiments of a method carried-out by an aircraft display system are further provided. In one embodiment, the method includes the step or process of generating a PFD and HSI graphics on one or more display screens included within the aircraft display system. Operation of the PFD is selectively switched between a heading-centered display mode and at least a first non-heading-centered display mode, such as a track-centered display mode or a split-centered display mode. When the PFD operates in the first non-heading-centered display mode, the HSI graphics are produced to include at least one movable HSI graphic element or symbol identifying a current heading of the aircraft. In an embodiment wherein the at least one movable HSI symbol includes or assumes the form of an HSI aircraft icon, the method further includes the step or process of rotating the HSI aircraft icon to point towards a current heading of the aircraft. Additionally or alternatively, a visual alert may be generated on the PFD by changing the appearance of at least one symbol or graphic element included in the HSI graphics when an angle between the current track and the current heading of the aircraft exceeds an angular threshold. The angular threshold may be a static value or, instead, a dynamic value adjusted as a function of aircraft airspeed, aircraft ground speed, proximity to ground, and/or other such factors.

BRIEF DESCRIPTION OF THE DRAWINGS

At least one example of the present disclosure will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. Furthermore, terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. Finally, the term "pilot," as appearing herein, is defined to encompass all members of a flight crew.

The following describes embodiments of an aircraft display system configured to generate Horizontal Situation Indicator (HSI) graphics including certain enhanced symbology. The enhanced HSI symbology aids in rapid visual correlation with an associated Primary Flight Display (PFD), which may include Attitude Director Indicator (ADI) graphics and which is operable in multiple different centering modes including at least one non-heading-centered display mode. For this reason, the enhanced HSI symbology is generically referred to herein as "PFD-correlated symbology." The PFD-correlated symbology can include, for example, an HSI aircraft icon and/or an HSI heading marker. The HSI aircraft icon and HSI heading marker may be actively rotated (or otherwise moved) to visually identify the current aircraft heading when the PFD operates in a non-heading-centered display mode, such as a track-centered display mode or a hybrid-centered display mode. Embodiments of the below-described aircraft display system are particularly well-suited for usage onboard rotary wing aircraft or "rotorcraft," which commonly experience relatively large disparities between heading and track. For this reason, the aircraft display system is primarily described below as a rotorcraft display system deployed onboard a rotorcraft. The following description notwithstanding, it will be appreciated that the below-described aircraft display system can similarly be deployed onboard other aircraft, including fixed wing aircraft, in further embodiments.

The HSI graphics can be generated alongside a PFD or, instead, integrated into a PFD as a composite graphical display; e.g., by superimposing the HSI graphics over a selected portion of the PFD. Additionally or alternatively, the aircraft display system may generate visual alerts when an angle between the aircraft heading and track exceeds an angular threshold value by altering the appearance of the HSI aircraft icon, the HSI heading marker, or another graphic element included in the HSI graphics. As a still further possibility, the HSI graphics may be generated to include a PFD centering marker identifying a current point relative to which the PFD is centered, as may be particularly useful when the PFD operates in a hybrid-centered or split-centered display mode. Through the introduction of such PFD-correlated symbology into the HSI graphics, a pilot is afforded with additional visual cues aiding in the rapid comprehension of the relationship between aircraft heading, aircraft track, and the current PFD centering mode at any given juncture in time. The situation awareness of the pilot may be enhanced as result. Examples of an aircraft display system suitable for generating HSI graphics including such PFD-correlated symbology will now be described in conjunction with FIG. 1.

Figure 1:
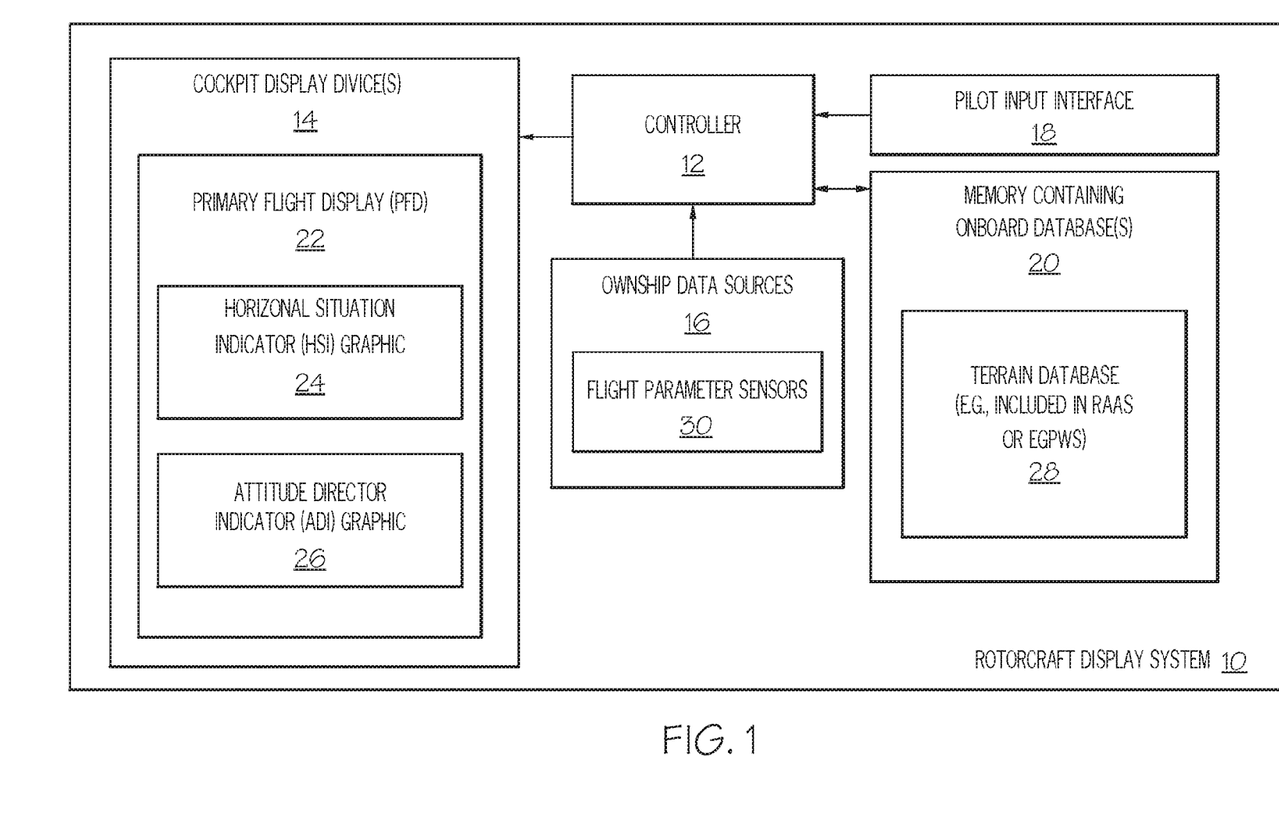
FIG. 1 is a block diagram of an aircraft display system deployed onboard a rotary wing aircraft (hereafter, a "rotorcraft display system") and illustrated in accordance with an exemplary embodiment of the present disclosure.

FIG. 1 is a block diagram of an aircraft display system 10 deployed onboard a rotorcraft, as illustrated in accordance with an exemplary and non-limiting embodiment of the present disclosure. As system 10 is deployed onboard a rotorcraft in the illustrated example, aircraft display system 10 is more specifically referred hereafter to as "rotorcraft display system 10." As schematically illustrated in FIG. 1, rotorcraft display system 10 includes the following components or subsystems, each of which may be comprised of one device or multiple interconnected devices: (i) a controller 12, (ii) one or more cockpit display devices 14, (iii) ownship data sources 16, (iv) a pilot input interface 18, and (v) a memory 20 containing any number of onboard databases. Controller 12 includes at least first, second, and third inputs, which are operatively coupled to ownship data sources 16, to pilot input interface 18, and to memory 20, respectively. Additionally, controller 12 includes at least first and second outputs, which are operatively coupled to cockpit display device(s) 14 and to memory 20, respectively. In further embodiments, display system 10 may include a greater or lesser number of components, which may be interconnected in various different manners utilizing any combination of wireless or wired (e.g., avionic bus) connections. Although rotorcraft display system 10 is schematically illustrated in FIG. 1 as a single unit, the individual elements and components of rotorcraft display system 10 can be implemented in a distributed manner using any number of physically-distinct and operatively-interconnected pieces of hardware or equipment.

Cockpit display device(s) 14 may be any image-generating device or devices, which include at least one display screen on which one or more graphical displays can be produced. Cockpit display device(s) 14 will often be affixed to the static structure of the rotorcraft cockpit, but may alternatively assume the form of or include movable display devices (e.g., head-worn display devices) or portable display devices, such as an Electronic Flight Bag (EFB) or laptop computer, carried into the rotorcraft cockpit by a pilot. Cockpit display device(s) 14 may include Head-Up Display (HUD) devices, Head-Down Display (HDD) devices, or a combination thereof. During operation of rotorcraft display system 10, controller 12 drives cockpit display device(s) 14 to generate one or more graphical displays thereon. For example, as schematically indicated in FIG. 1, controller 12 may drive cockpit display device(s) 14 to generate a PFD 22, HSI graphics 24, and ADI graphics 26 on one or more display screens of display device(s) 14. PFD 22, HSI graphics 24, and ADI graphics 26 may be generated as a composite graphical display by visually integrating HSI graphics 24 and ADI graphics 26 into PFD 22. For example, HSI graphics 24 and ADI graphics 26 may be superimposed over and visually blended into PFD 22, as described more fully below in conjunction with FIGS. 2-5. The following description notwithstanding, rotorcraft display system 10 need not produce HSI graphics 24 on PFD 22 in all embodiments. For example, in further embodiments, HSI graphics 24 can be produced alongside PFD 22 (e.g., in a side-by-side format) on the same display or, instead, HSI graphics 24 and PFD 22 can be generated on separate display devices.

Controller 12 may comprise or be associated with any suitable number of individual microprocessors, flight control computers, navigational equipment, memories (including or in addition to memory 20), power supplies, storage devices, interface cards, and other standard components known in the art. Controller 12 may include or cooperate with any number of software programs (e.g., avionics display programs) or instructions (e.g., as stored in memory 20) designed to carry out the various methods, process tasks, calculations, and control/display functions described below. Although illustrated as a separate block in FIG. 1, memory 20 may be integrated into controller 12 in certain embodiments. In one embodiment, controller 12 and memory 20 are produced as an Application Specific Integrated Circuit (ASIC), a System-in-Package (SiP), or a microelectronic module. Memory 20 may store data utilized to support the operation of rotorcraft display system 10 including one or more onboard databases, such as a terrain database 26 generically shown in FIG. 1. In one embodiment, terrain database 26 are included in an Enhanced Ground Proximity Warning System (EGPWS) or a Runway Awareness and Advisory System (RAAS). In further embodiments, memory 20 may also contain various other types of databases including, for example, navigational, weather, and/or runway databases.

Ownship data sources 16 can include any number of onboard sensors, datalinks, and other such components suitable for directly monitoring or wirelessly receiving data useful in performing the processes described herein. The particular types of data collected by ownship data sources 16 and provided to controller 12 will vary amongst different embodiments of rotorcraft display system 10. Generally, at minimum, ownship data sources 16 will include a number of flight parameter sensors 30, which supply data to controller 12 describing various different operational conditions of the ownship rotorcraft utilized in generating PFD 22, HSI graphics 24, and ADI graphics 26, as described below. Flight parameter sensors 30 and, more generally, ownship data sources 16 may also include other systems or subsystems commonly deployed onboard aircraft, such as a Flight Management System ("FMS"), an Inertial Reference System ("IRS"), and/or an Attitude Heading Reference System ("AHRS"). Data provided by ownship data sources 16 may include, without limitation: airspeed data; groundspeed data; altitude data; attitude data including pitch data and roll data; yaw data; geographic position data, such as Global Positioning System ("GPS") data; gross aircraft weight; time/date information; heading information; atmospheric conditions; flight path data; track data; radar altitude; geometric altitude data; wind speed data; wind direction data; fuel consumption; and so on.

Figure 2:
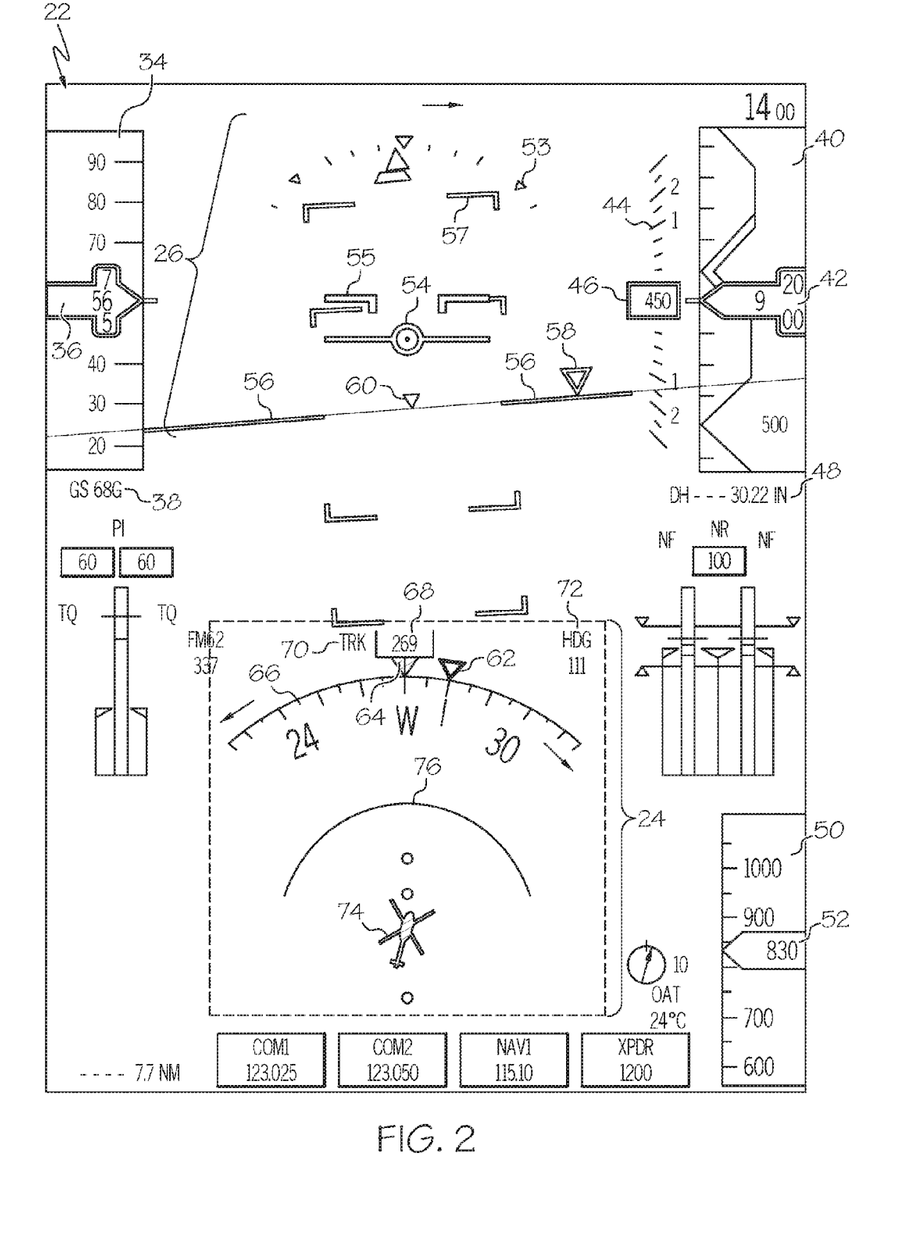
FIG. 2 is a screenshot of a first exemplary Primary Flight Display (PFD), which may be generated by the rotorcraft display system (FIG. 1), which is shown in a track-centered display mode, and which includes Horizontal Situation Indicator (HSI) graphics having PFD-correlated symbology.

FIG. 2 is a screenshot of an exemplary PFD 22 that may be generated on cockpit display device(s) 14 by controller 12 during operation of rotorcraft display system 10 (FIG. 1). In this particular example, PFD 22 is generated as a Synthetic Vision PFD including graphical renderings of synthetic terrain and other geographical features, which simulate the view from the rotorcraft cockpit under ideal visibility conditions. PFD 22 is thus referred to as "SV-PFD 22" hereafter. Among other symbols or graphics, SV-PFD 22 is generated to include HSI graphics 24 and ADI graphics 26: the reference numerals "22," "24," and "26" carried-over from rotorcraft display system 10 schematically shown in FIG. 1 for consistency and with the understanding that the appearance of SV-PFD 22, HSI graphics 24, and ADI graphics 26 will vary amongst embodiments. HSI graphics 24 and ADI graphics 26 are described more fully below. First, however, a brief description of other graphic elements included within SV-PFD 22 is provided to help establish an exemplary context in which HSI graphics 24 and ADI graphics 26 may be better understood.

SV-PFD 22 includes multiple graphic elements or symbols, which visually convey current flight parameters of the rotorcraft on which rotorcraft display system 10 is deployed. Many of the symbols or graphic elements shown in FIG. 2 are well-known within the avionics industry and will not be described in detail herein. For completeness, however, it is generally noted that SV-PFD 22 contains the following graphic elements in addition to HSI graphics 24 and ADI graphics 26: (i) an airspeed indicator or "airspeed tape" 34 featuring a precision readout window 36 (located in the upper left corner of SV-PFD 22); (ii) a ground speed readout 38 (located beneath airspeed tape 34); (iii) an altitude indicator or "altitude tape" 40 featuring a precision readout window 42 (located in the upper right corner of SV-PFD 22); (iv) a vertical speed indicator 44 featuring a precision readout window 46 (located adjacent altitude tape 40); (v) a barometric pressure setting readout 48 (located beneath altitude tape 40); (vi) a radio altitude indicator 50 featuring a precision readout window 52 (located in the lower right corner of SV-PFD 22); and (vii) a flight path vector icon 54, which moves across SV-PFD 22 to reflect changes in the flight path of the rotorcraft.

In the exemplary embodiment illustrated in FIG. 2, ADI graphics 26 include a number of different symbols or graphic elements. These graphic elements include a roll arc graphic 53; an ADI A/C symbol 55 in the form of two L-shaped polygons; a zero pitch reference line 56, which is split into two halves or line segments; a pitch tape graphic 57; an ADI heading marker 58; and an ADI track marker 60. By comparison, HSI graphics 24 likewise include an HSI heading marker 62 and an HSI track marker 64. For rapid visual correlation, ADI heading marker 58 and HSI heading marker 62 may be depicted by or represented by substantially identical symbols. For example, as shown in FIG. 2, ADI heading marker 58 and HSI heading marker 62 may each be represented by a relatively large, inverted, hollow triangular symbol. Similarly, ADI track marker 60 and HSI track marker 64 may also be represented by substantially identical symbols; e.g., as further shown in FIG. 2, ADI track marker 60 and HSI track marker 64 may be represented by smaller, inverted, filled triangular symbols. ADI heading marker 58, ADI track marker 60, HSI heading marker 62, and HSI track marker 64 may be generated in an informational color specified by a color coding scheme, such as green or white (represented by a first cross-hatch pattern in FIG. 2). In further embodiments of PFD 22, ADI heading marker 58, ADI track marker 60, HSI heading marker 62, and HSI track marker 64 can vary in coloring, appearance, and relative positioning.

HSI graphics 24 further include a compass graphic 66, a precision readout window 68, a PFD centering mode text annunciation 70, and a current heading readout 72. While only an arc-shaped segment of compass graphic 66 is shown in this particular example, it will be appreciated that compass graphic 66 is visually rotated about its centerpoint during operation of SV-PFD 22 such that the relevant segment of compass graphic 66 is presented on SV-PFD 22 at a given moment in time. A rotatable aircraft (A/C) icon 74 is produced at the rotational center of compass graphic 66 and surrounded by a range ring 76 (also only partially shown). When SV-PFD 22 operates in a non-heading-centered display mode, controller 12 (FIG. 1) repeatedly updates or refreshes SV-PFD 22 to visually rotate A/C icon 74 such that icon 74 (in particular, the nose of the rotorcraft symbol) points toward the current heading of the ownship rotorcraft, as monitored in real time by ownship data sources 16 (FIG. 1). In a similar manner, HSI heading marker 62 is moved relative to compass graphic 66 (e.g., rotated about the centerpoint of compass graphic 66 to slide along the outer circumferential of graphic 66) such that marker 62 visually identifies the current heading of the ownship rotorcraft on compass graphic 66. By rotating A/C icon 74 and HSI heading marker 62 relative to compass graphic 66 in this manner, a clear indication is provided via HSI graphics 24 as to the current heading of the ownship rotorcraft. Additionally, A/C icon 74 will generally point toward HSI heading marker 62 as marker 62 travels along the outer circumferential of graphic 66 to provide an intuitive visual correlation between these symbols. Concurrent with the above-described rotation of A/C icon 74 and HSI heading marker 62, compass graphic 66 is also actively rotated relative to HSI track marker 64, as appropriate, to reflect changes in the geographic bearing of the rotorcraft track.

It the exemplary scenario of FIG. 2, ADI track marker 60 and HSI track marker 64 are generated in vertically centered positions. From this positioning of markers 60, 64, and from PFD centering mode text annunciation 70, it can be determined that SV-PFD 22 is currently operating in a track-centered display mode. While SV-PFD 22 is not currently centered on rotorcraft heading, a pilot can nonetheless quickly ascertain the current relationship between rotorcraft heading and track by glancing at HSI graphics 24 and noting the angular positioning of HSI heading marker 62 relative to HSI track marker 64. The current heading of the rotorcraft is further visually reinforced by the angular orientation of rotating A/C icon 74. Furthermore, a pilot can readily mentally trace a first line extending from A/C icon 74 to HSI heading marker 62, as well as a second line from HSI heading marker 62 to ADI heading marker 58 on zero pitch reference line 56, to quickly visually locate the heading symbology produced on SV-PFD 22. Any mismatches or inconsistencies between the symbology of HSI graphics 24 and ADI graphics 26 are thus eliminated, while rapid pilot comprehension of the current rotorcraft heading and track is facilitated when SV-PFD 22 operates in a non-heading-centered display mode, such as the track-centered display mode shown in FIG. 2.

Figure 3:
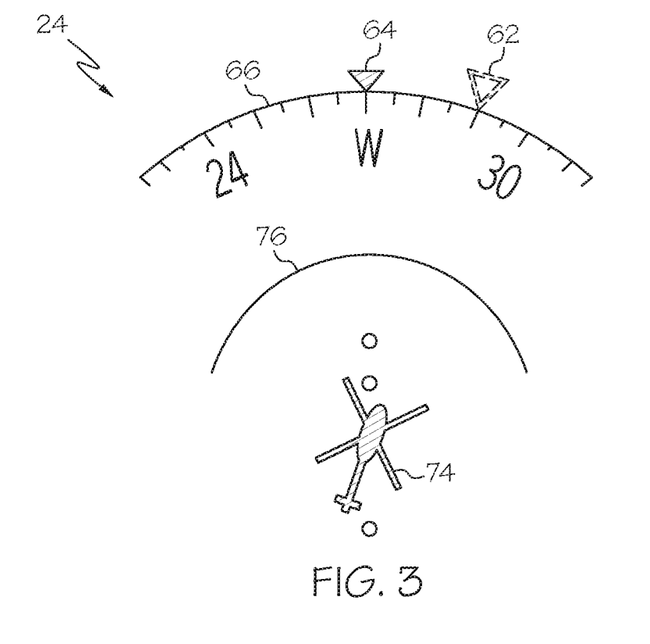
FIGS. 3 and 4 are screenshots of a portion of the exemplary PFD shown in FIG. 2 illustrating manners in which the appearance of certain PFD-correlated symbology included within the HSI graphics may be varied under different alert or advisory conditions.
Figure 4:
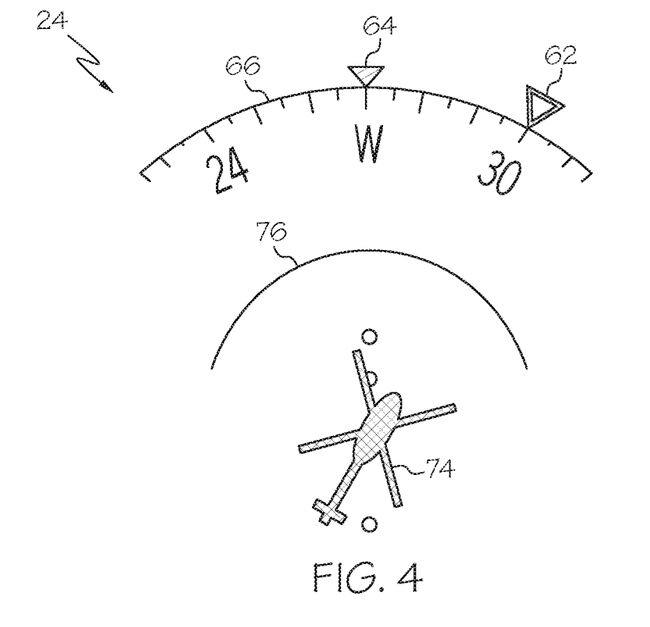

No visual alerts or heading-related notifications are generated on SV-PFD 22 in the exemplary scenario shown in FIG. 2. As the flight parameters of the rotorcraft change, it may become desirable to generate certain alerts or visual notifications on SV-PFD 22 through HSI graphics 24. When it is desired to generate such an alert, the appearance of at least one graphic element or symbol included in HSI graphics 24 may be varied in a manner notifying a pilot of the alert condition. By way of non-limiting example, two alert or advisory conditions that may be visually expressed on SV-PFD 22 by altering the appearance of HSI graphics 22 are shown in FIGS. 3 and 4. Addressing first the alert condition shown in FIG. 3, it can be seen that the appearance of HSI heading marker 62 has been changed. In particular, the symbol or icon representative of HSI heading marker 62 (again, in this example, an inverted hollow triangle symbol) is now generated to have a dashed appearance. This visual change to HSI heading marker 62 constitutes a relatively low level alert or advisory condition, which is generated when the rotorcraft heading has moved outside of the current FOV of SV-PFD 22, while SV-PFD 22 operates in a non-heading-centered display mode. If desired, the appearance of ADI heading marker 58 (FIG. 2) may also be altered in a similar manner; e.g., the hollow inverted triangular symbol corresponding to marker 58 in FIG. 2 may concurrently be produced to have a dashed appearance substantially identical to that shown in FIG. 3. If desired, the appearance of HSI heading marker 62 and, possibly, ADI heading marker 58 may be altered in another manner during this alert condition, such as by animating markers 58, 62, generating markers 58, 62 to have enlarged dimensions, generating markers 58, 62 in a pre-established caution color, and so on.

FIG. 4 illustrates a further manner in which the appearance of HSI graphics 24 may be altered to generate a second type of alert or visual notification on SV-PFD 22. In this example, a visual alert is presented via HSI graphics 24 indicating that an angle (the "crab angle") between the current rotorcraft heading and track has exceeded a predetermined angular threshold value. For example, as may be gathered by comparing the relatively positioning of HSI heading marker 62, HSI track marker 64, and compass graphic 66 in FIG. 4, the difference between rotorcraft heading and track is currently approximately 30 degrees (noting that the degree labels are expressed in multiples of ten on graphic 66). Controller 12 (FIG. 1) has determined that this disparity exceeds a predetermined angular warning threshold and updated SV-PFD 22 and, specifically, HSI graphics 24 to generate a corresponding visual warning. Thus, as may be appreciated by comparing FIG. 4 to FIGS. 2 and 3, HSI track marker 64 has been amplified or generated to have enlarged dimensions. Additionally, HSI track marker 64 is drawn in a pre-established caution color (e.g., amber), indicated in FIG. 4 by a second cross-hatch pattern. Similarly, the appearance of rotating A/C icon 74 has also been changed by, for example, generating A/C icon to have enlarged dimensions and to also appear in the pre-established caution color.

In further embodiments, a visual alert indicative of such an excessive or pronounced crab angle can be generated by altering the appearance of HSI graphics 24 in another manner. For example, in further embodiments, one or more additional graphic elements may be introduced to HSI graphics 24 at a location between markers 62, 64 as part of the visual alert; and/or A/C icon 74 or HSI track marker 64 may be animated by, for example, applying a flashing effect to these graphics. The angular threshold for generating a visual alert indicative of an excessive crab angle will vary amongst embodiments. In certain embodiments, this angular threshold may be a static value. In other embodiment, the angular threshold may be a dynamic value, which is adjusted as a function of rotorcraft airspeed, rotorcraft ground speed, proximity to ground, and other such factors. In still further embodiments, multiple different graded or categorized alerts can be generated on SV-PFD 22 via changes to the appearance of HSI graphics 24, with the graded alerts progressively increasing in urgency with increasing crab angle.

There has thus been described an exemplary embodiment of an aircraft display system for generating HSI graphics (e.g., HSI graphics 24), which contain at least one movable HSI symbol or PFD-correlated symbology. The PFD-correlated symbology can include an HSI heading marker (e.g., heading marker 62) and/or a rotating A/C icon (e.g., A/C icon 74), which are moved relative to a compass graphic to identify a current heading of the rotorcraft when an associated PFD (e.g., SV-PFD 22) operates in a non-heading-centered display mode. In the exemplary embodiment shown in FIG. 2, SV-PFD 22 is generated in a track-centered display mode. In other embodiments, SV-PFD 22 may be selectively generated in another non-heading-centered display mode in addition to or in lieu of such a track-centered display mode. Furthermore, the appearance of HSI graphics 24 may vary in alternative embodiments, as may the number and type of symbols or graphic elements included within graphics 24. To further illustrate this point, FIG. 5 sets-forth a second SV-PFD 22', which may be generated by rotorcraft display system 10 (FIG. 1) on cockpit display device(s) 14 in another embodiment of the present disclosure. Many of symbols or graphic elements included within SV-PFD 22' are similar to those included within SV-PFD 22 (FIG. 2) and described above in conjunction with FIGS. 2-4. Accordingly, like reference numerals have been utilized to denote like graphic elements with the addition of a prime (') symbol to indicate that such elements may different to varying extents, as described more fully below.

Figure 5:
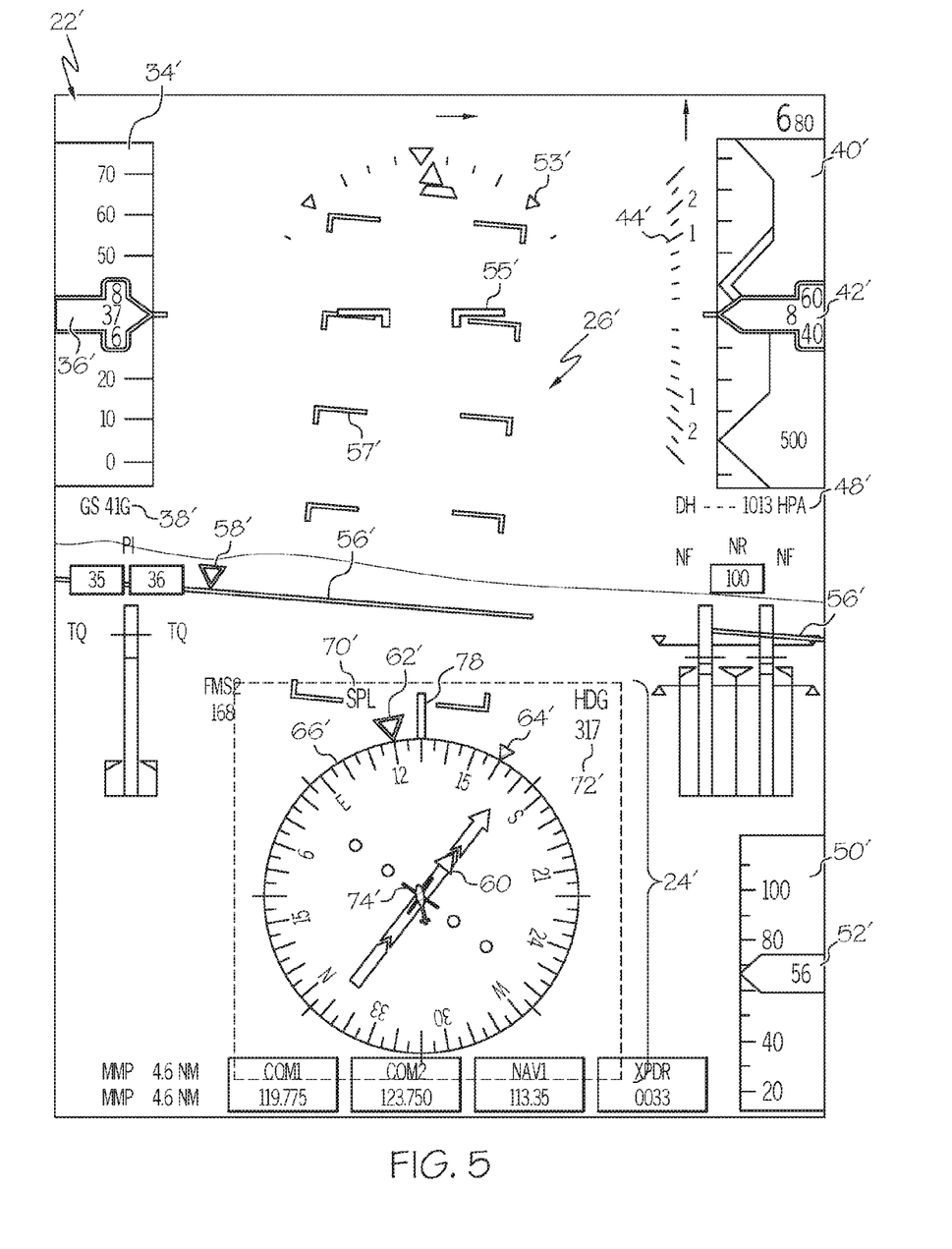
FIG. 5 is a screenshot of a second exemplary Primary Flight Display (PFD), which may be further generated by the rotorcraft display system (FIG. 1), which is shown in split-centered display mode, and which includes HSI graphics containing PFD-correlated symbology.

Referring now to FIG. 5, SV-PFD 22' is generated in hybrid-centered or split-centered display mode. This may be appreciated by comparing the relative angular positioning of HSI heading marker 62', HSI track marker 64', and compass graphic 66'. In contrast to compass graphic 66 shown in FIGS. 2-4, compass graphic 66' is generated as a full ring in FIG. 5. Additionally, in the case of SV-PFD 22' (FIG. 5), HSI graphics 24' are now generated to include an additional graphic element in the form of a PFD centering marker 78. During operation of rotorcraft display system 10 (FIG. 1), controller 12 updates SV-PFD 22' to visually move PFD centering marker 78 with respect to compass graphic 66' such that marker 78 visually identifies (by pointing to the proper hatch mark or gradation on graphic 66') the point on which SV-PFD 22' is presently centered. In so doing, PFD centering marker 78 visually denotes that SV-PFD 22' is currently operating in a split-centered display mode and further provides an intuitive indication as to the current angular relationship between current rotorcraft heading, rotorcraft track, and the location of the intermediary point between rotorcraft heading and track on which SV-PFD 22' is presently centered.

PFD centering marker 78 is usefully generated when SV-PFD 22' operates in a split-centered display mode, such as the split-centered display mode shown in FIG. 5. Thus, in certain embodiments, PFD centering marker 78 may appear (e.g., gradually fade-in) when SV-PFD 22' initially transitions into operation in a split-centered mode and then disappear (e.g., gradually fade-out) when SV-PFD 22' switches to a different centering mode, such as a heading-centered display mode or a track-centered display mode of the type shown in FIG. 2. In further embodiments, PFD centering marker 78 may be generated in all PFD centering modes or in all non-heading-centered PFD display modes. In the exemplary embodiment shown in FIG. 5, PFD centering maker 78 is generated as a relatively thick line segment, which is positioned adjacent and which moves relative to the outer circumference of compass graphic 66'. In further embodiments, the appearance and/or positioning of PFD centering marker 78 with respect to compass graphic 66' may vary, providing that marker 78 is capable of providing its described functionality.

There has thus been provided multiple exemplary embodiments of a rotorcraft display system (and, more generally, an aircraft display system) configured to generate an HSI graphics including PFD-correlated symbology. In an embodiment, the PFD-correlated symbology includes one or more movable HSI symbols, such as a HSI aircraft icon and/or a HSI heading marker, which are rotated (or otherwise moved) to visually identify the current aircraft heading when the PFD operates in a non-heading-centered display mode, such as a track-centered or hybrid-centered display mode. The HSI graphics can be generated alongside a PFD or integrated into a PFD as a composite display by, for example, superimposing the HSI symbology over a selected portion of the PFD. Additionally or alternatively, the aircraft display system may selectively generate visual alerts when an angle between the aircraft heading and track exceeds an angular threshold by altering the appearance of the HSI graphics in one or more predetermined manners; e.g., by generating the HSI aircraft icon and/or the HSI heading marker to have a more pronounced appearance. In certain embodiments, the HSI graphics may be generated to further include a PFD centering marker, which identifies (e.g., on a compass graphic included in the HSI graphics) the centering point of the PFD. Through the incorporation such additional graphic elements or symbology into the HSI graphics, the speed and accuracy with which a pilot may ascertain the relationship between aircraft heading, aircraft track, and the current PFD centering mode can be favorably enhanced.

Multiple exemplary embodiments have been described above in the context of a fully functioning computer system in the form of an aircraft display system (e.g., rotorcraft display system 10 shown in FIG. 1); however, those skilled in the art will recognize that the mechanisms of the present disclosure are capable of being distributed as a program product and, furthermore, that the teachings of the present disclosure apply to the program product regardless of the particular type of non-transitory, computer-readable media (e.g., floppy disc, hard drive, memory card, optical disc, etc.) employed to carry-out its distribution. Indeed, in certain embodiments and depending upon the existing equipment deployed onboard a rotorcraft or other aircraft, an aircraft display system providing the above-described display functionalities may be realized or implemented in at least some embodiments through a relatively simple software upgrade.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An aircraft display system deployed onboard an aircraft, the aircraft display system comprising:
   at least one cockpit display device; and
   a controller operably coupled to the cockpit display device, the controller configured to:
      generate a Primary Flight Display (PFD) and Horizontal Situation Indicator (HSI) graphics on the at least one cockpit display device, the PFD having a Field of View (FOV);
      selectively switch operation of the PFD between a heading-centered display mode and at least a first non-heading-centered display mode;
      when the PFD operates in the first non-heading-centered display mode, produce the HSI graphics to include a compass graphic and an HSI heading marker, which moves relative to the compass graphic to identify the current heading of the aircraft when the PFD operates in the first non-heading-centered display mode;
      generate the PFD to include Attitude Director Indicator (ADI) graphics comprising an ADI heading marker indicating a current heading of the aircraft; and
      concurrently vary the appearance of the HSI heading marker and the ADI indicator when the current heading of the aircraft exceeds the FOV of the PFD.

2. The aircraft display system of claim 1 wherein the at least one movable HSI symbol comprises an HSI aircraft icon, and wherein the controller is configured to rotate the HSI aircraft icon to point towards the current heading of the aircraft when the PFD operates in the first non-heading-centered display mode.

3. The aircraft display system of claim 1 wherein the controller is further configured to generate the PFD to include Attitude Director Indicator (ADI) graphics comprising an ADI heading marker; and
   wherein the ADI heading marker and the HSI heading marker are represented by matching symbols.

4. The aircraft display system of claim 1 wherein the controller is configured to generate a visual alert on the PFD by altering the appearance of at least one graphic element included in the HSI graphics when an angle between the current track and the current heading of the aircraft exceeds a predetermined angular threshold.

5. The aircraft display system of claim 4 wherein the controller is configured to:
   generate the HSI symbol to include an HSI aircraft icon and an HSI heading marker; and
   vary the appearance of at least one of the HSI aircraft icon and the HSI heading marker when the angle between the current track and the current heading of the aircraft exceeds the predetermined angular threshold.

6. An aircraft display system deployed onboard an aircraft, the aircraft display system comprising:
   at least one cockpit display device; and
   a controller operably coupled to the cockpit display device, the controller configured to:
      generate a Primary Flight Display (PFD) and Horizontal Situation Indicator (HSI) graphics on the at least one cockpit display device, the PFD having a Field of View (FOV);
      selectively switch operation of the PFD between a heading-centered display mode and at least a split-centered display mode in which the PFD is centered on an intermediary point between the current heading and the current track of the aircraft; and
      produce the HSI graphics to include a compass graphic and an HSI heading marker, which moves relative to the compass graphic to identify the current heading of the aircraft when the PFD operates in the split-centered display mode.

7. The aircraft display system of claim 6 wherein the controller is configured to generate the HSI graphics to include a PFD centering marker, which moves with respect to the compass graphic to indicate a point on which PFD is centered when operating in the split-centered display mode.

8. The aircraft display system of claim 6 wherein the at least one movable HSI symbol comprises an HSI aircraft icon, and wherein the controller is configured to rotate the HSI aircraft icon to point towards the current heading of the aircraft when the PFD operates in the first non-heading-centered display mode.

9. The aircraft display system of claim 6 wherein the at least one movable HSI symbol comprises an HSI heading marker, which moves relative to the compass graphic to identify the current heading of the aircraft when the PFD operates in the first non-heading-centered display mode.

10. The aircraft display system of claim 6 wherein the controller is configured to generate a visual alert on the PFD by altering the appearance of at least one graphic element included in the HSI graphics when an angle between the current track and the current heading of the aircraft exceeds a predetermined angular threshold.

11. An aircraft display system deployed onboard an aircraft, the aircraft display system comprising:
    at least one cockpit display device; and
    a controller operably coupled to the at least one cockpit display device, the controller configured to:
       generate a Primary Flight Display (PFD) and Horizontal Situation Indicator (HSI) graphics on the at least one cockpit display device, the HSI graphics including an HSI track marker and an HSI heading marker identifying of a current track and a current heading of the aircraft, respectively;

when an angle between the current track and the current heading of the aircraft exceeds an angular threshold, generating a visual alert on the PFD by altering the appearance of at least one of the HSI graphics in a first predetermined manner;

selectively generate the PFD in a split-centered display mode in which the PFD is centered on an intermediary point between the current heading and the current track of the aircraft; and produce the HSI graphics to include a compass graphic and a PFD centering marker, which moves with respect to the compass graphic to indicate the intermediary point on which PFD is centered when operating in the split-centered display mode.

12. The aircraft display system of claim 11 wherein the controller is configured to:
generate the HSI graphics to further include an HSI aircraft icon; and
vary the appearance of at least one of the HSI aircraft icon and the HSI heading marker when the angle between the current track and the current heading of the aircraft exceeds the angular threshold.

13. The aircraft display system of claim 11 wherein the controller is further configured to:
generate Attitude Director Indicator (ADI) graphics on the PFD comprising an ADI heading marker; and
produce the HSI graphics to include a movable HSI heading marker, which moves in conjunction with the ADI heading marker when the PFD operates in at least a first non-heading-centered display mode.

14. The aircraft display system of claim 11 wherein the PFD is operable in a non-heading-centered display mode, and wherein the controller is configured to generate the HSI to include an aircraft icon, which is visually rotated point towards the current heading of the aircraft when the PFD operates in the non-heading-centered display mode.

15. A method carried-out by an aircraft display system deployed onboard an aircraft, the method comprising:
generating a Primary Flight Display (PFD) and Horizontal Situation Indicator (HSI) graphics on at least one display screen of the aircraft display system;
selectively switching operation of the PFD between a heading-centered display mode and at least a first non-heading-centered display mode;
when the PFD operates in the first non-heading-centered display mode, producing the HSI graphics to include a compass graphic and at least one movable HSI symbol identifying a current heading of the aircraft;
selectively generating the PFD in a split-centered display mode in which the PFD is centered on an intermediary point between the current heading and the current track of the aircraft; and
producing the HSI graphics to include a compass graphic and a PFD centering marker, which moves with respect to the compass graphic to indicate the intermediary point on which PFD is centered when operating in the split-centered display mode.

16. The method of claim 15 wherein the at least one movable HSI symbol comprises an HSI aircraft icon, and wherein the method further comprising rotating the HSI aircraft icon to point towards the current heading of the aircraft when the PFD operates in the first non-heading-centered display mode.

17. The method of claim 15 further comprising generating a visual alert by altering the appearance of at least one symbol included in the HSI graphics when an angle between the current track and the current heading of the aircraft exceeds an angular threshold.

18. The method of claim 15 further comprising:
generating Attitude Director Indicator (ADI) graphics on the PFD comprising an ADI heading marker; and
producing the HSI graphics to include a movable HSI heading marker, which moves in conjunction with the ADI heading marker when the PFD operates in the first non-heading-centered display mode.

19. The method of claim 18 further comprising:
generating the ADI heading marker and the HSI heading marker as substantially identical symbols; and
concurrently vary the appearance of the HSI heading marker and the ADI heading marker when the current heading of the aircraft exceeds a Field of View (FOV) of the PFD.

20. The aircraft display system of claim 11 wherein the controller is configured to generate a visual alert on the PFD by altering the appearance of at least one graphic element included in the HSI graphics when an angle between the current track and the current heading of the aircraft exceeds a predetermined angular threshold.

\* \* \* \* \*